United States Patent [19]

Lewis

[11] B 4,014,794

[45] Mar. 29, 1977

[54] OIL FILTER ADAPTER

[75] Inventor: William Dein Lewis, Wilmington, Del.

[73] Assignee: E. I. Du Pont de Nemours and Company, Wilmington, Del.

[22] Filed: Mar. 11, 1974

[21] Appl. No.: 449,988

[44] Published under the second Trial Voluntary Protest Program on March 30, 1976 as document No. B 449,988.

[52] U.S. Cl. .............................. 210/199; 210/206; 210/209; 23/267 D; 23/272.6 R; 252/59
[51] Int. Cl.² ................... B01D 35/00; C10M 7/02
[58] Field of Search .......... 210/199, 206, 209, 501, 210/502, 167; 23/267 D, 267 B, 272.6 R; 252/56 R, 59

[56] References Cited
UNITED STATES PATENTS

| | | | |
|---|---|---|---|
| 2,580,856 | 1/1952 | Smith et al. | 23/267 D |
| 2,627,977 | 2/1953 | Kent | 23/267 D |
| 3,507,932 | 4/1970 | Morduchowitz et al. | 252/56 R X |
| 3,630,905 | 12/1971 | Sorgo | 252/59 X |
| 3,634,249 | 1/1972 | Dupas et al. | 252/59 |
| 3,687,849 | 8/1972 | Abbott | 252/56 R X |
| 3,715,037 | 2/1973 | Shin-En Hu et al. | 210/501 |
| 3,749,247 | 7/1973 | Rohde | 210/501 X |
| 3,772,196 | 11/1973 | St. Clair et al. | 252/56 R X |

*Primary Examiner*—Frank A. Spear, Jr.
*Assistant Examiner*—Ferris H. Lander

[57] ABSTRACT

An adapter for metering oil viscosity index improver and other additives into flowing oil is provided. The adapter is normally used in combination with a conventional oil filter and is placed between the oil filter and the engine of a vehicle. The adapter contains a solid, oil-soluble oil viscosity index improver in association with means, preferably a perforated sheet surrounding the improver, to limit contact of the improver with oil which flows through the adapter from the engine to the oil filter.

4 Claims, 1 Drawing Figure

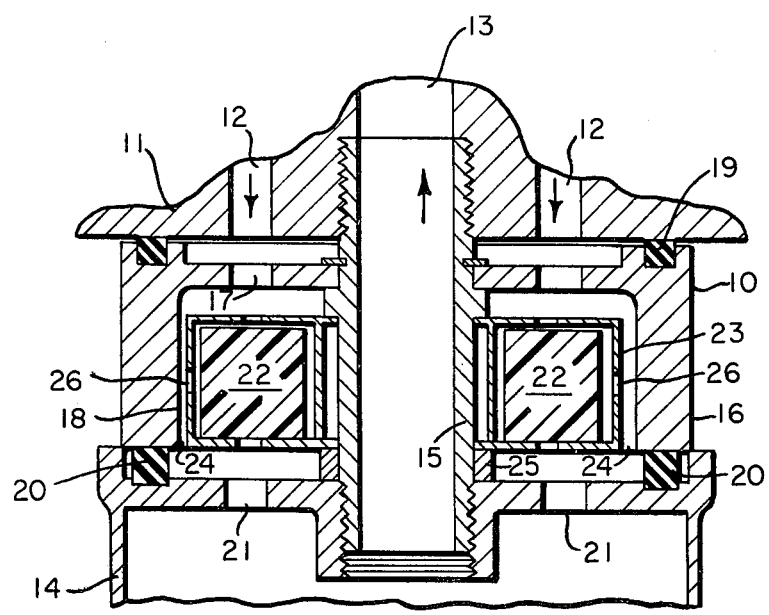

OIL FILTER ADAPTER

BACKGROUND OF THE INVENTION

1. Field of Invention

This invention relates to adapters for oil filters and more particularly to such adapters which will add viscosity index improver to oil at a controlled rate.

2. Prior Art

It is well known that mineral lubricating oils and functional fluids have a tendency to become thin at elevated temperatures while becoming thick at low temperatures, and thus it is generally necessary to incorporate additives which improve their viscosity-temperature relationships. For example, in the case of a crankcase lubricating oil in a cold engine, it is desirable that the oil not become so thick that it is difficult to start the engine. On the other hand, when the engine is hot, it is necessary that the oil be sufficiently viscous that an oil film is maintained between the moving parts.

The viscosity-temperature relationship of an oil at temperatures in the range of 110° to 210°F. is known as its viscosity index. Thus, additives which retard the tendency of the oil to thin as the temperature is raised from 100° to 210°F. are known as viscosity index improvers. Viscosity index improvers which are known include polymers of methacrylate esters having long alkyl chains, polyisobutylene polymers, and polyalkyl styrenes. The methacrylate type improvers are described in U.S. Pat. No. 2,114,233, issued Apr. 12, 1938 to Harry Trainor et al. and U.S. 2,737,496, issued Mar. 6, 1956 to Willard E. Catlin. The polyisobutylene improver is described in U.S. Pat. No. 2,130,507, issued Sept. 20, 1938 to Michael Otto et al. Polyalkyl styrene type improvers are described in U.S. Pat. No. 2,072,120, issued Mar. 2, 1937 to Louis A. Mikeska et al. Many patents have issued subsequently to those above described which disclose many types of additives which can be included with the improver.

Viscosity index improvers which are widely used at the present time are crude ethylene-propylene copolymers which are dissolved in mineral oil or lubricating oil to form a concentrate and the resulting viscous solution added to motor oils and other oils as viscosity index improvers. Such material are described in U.S. Pat. No. 3,598,738, issued to Charles B. Biswell et al. on Aug. 10, 1971; U.S. Pat. No. 3,560,384, issued Feb. 2, 1971, to Robert A. Halling and U.S. Pat. No. 3,679,830, issued July 25, 1972, to Charles B. Biswell et al.

In present practice where the viscosity index improver is added to lubricating oil, the contribution of the improver immediately begins to deteriorate during operation. Thus, at some point prior to the end of the useful life of the oil, the oil has thinned out and the improver is no longer effective. U.S. Pat. No. 3,336,223, issued Aug. 15, 1967, to P. D. Kneeland teaches an oil filter useful in maintaining an effective concentration of additives in oil.

SUMMARY OF THE INVENTION

According to the present invention there is provided a device for monitoring oil viscosity index improver into flowing oil comprising: an outer casing having at least one opening in an end of said casing to permit entrance of flowing oil and at least one opening opposite said entrance opening to permit exit of flowing oil a solid, oil-soluble oil viscosity index improver placed within said casing and means in association with the viscosity index improver to limit contact of the improver with oil.

BRIEF DESCRIPTION OF DRAWINGS

The drawing is a cross-sectional view of an oil filter adapter placed between an engine block and oil filter.

DETAILED DESCRIPTION OF THE INVENTION

The present invention provides an oil filter adapter which will continually add viscosity index improver to oil, particularly to the lubricating oil of an internal combustion engine during periods of operation. Use of the adapter reduces the tendency of oil to "thin out" with use. The adapter can be charged with viscosity index improver or replaced independent of the oil filter.

With reference to the drawings, the adapter 10 of the invention is shown placed between an engine block 11, having oil outlet ports 12 and oil inlet port 13, and a conventional oil filter 14, either of the spin-on type or replaceable filter type. The oil inlet port 13 is a tapped hole engaging an extended stud portion 15. Both adapter 10 and oil filter 14 are mounted on stud 15 either by both being screwed onto stud 15 or by slipping adapter 10 onto the stud and holding it in place by screwing oil filter 14 onto stud 15. A gasket 19 seals the adapter to the block while the gasket 20 (built into the oil filter) seals the filter to the adapter.

The adapter itself has an outer casing 16, usually circular in configuration and made out of some metal such as steel or some plastic material which is oil-insoluble. Holes 17 in the top of casing 16 permits oil from engine block 11 to flow into annular chamber 18 inside casing 16. An opening 24 in the bottom of casing 16 permits oil to flow from the adapter 10 to the oil filter 14 through holes 21 in the oil filter.

In annular chamber 18 of adapter 10 is placed a toroidal shaped, solid, viscosity index improver 22. The improver is a solid material, preferably a polymer, which dissolves in the heated, circulating oil at rates proportional to contact area, circulation rate and temperature. The improver is used in association with means to limit contact between the improver and circulating oil. Preferably, the improver is encased in a thin metal shield 23 having perforations 26. Washer or nut 25 holds the shield 23 above the top of filter 14. The perforations can be any shape, e.g., circular, triangular, rectangular, oblong, and of a size such that when used with a polymeric improver of specified viscosity and dissolution rate, the polymer will dissolve in the oil over a period of time. A preferred period of time would be the normal time period recommended by automobile manufacturers between oil changes, e.g., 4,000 miles or 4 months whichever comes first.

The solid oil viscosity index improvers useful in the oil filter of the invention must be oil-soluble. This means that the improvers must be capable of being dissolved in hot circulating oil (usually 200° to 250°F. for circulating lubricating oil) and remain dissolved at ambient temperatures.

Particularly useful and preferred improvers are ethylene/propylene copolymers containing up to 10% by weight of 1,4-hexadiene. it is preferred that the ethylene content be between about 25 and 55% by weight and the propylene content be between 35 and 75% by weight. These copolymers and other such useful ethylene/propylene copolymers are described in U.S. Pat. No. 3,598,738, the disclosure of which is hereby incorporated by reference. Other useful copolymers of ethylene and propylene are described in U.S. Ser. No. 319,898 filed Dec. 29, 1972 in the names of J. B. Campbell et al. and assigned to the assignee of this application. This pending application is hereby incorporated by reference.

The polymeric improvers described in the aforesaid U.S. Pat. Nos. 2,114,233; 2,737,496; 2,130,507 and 2,072,120 can be used in the oil filter of the invention. The disclosures of these patents are hereby incorporated by reference.

Some of the ethylene/propylene copolymers useful in the oil filter of this invention are commercially available. For copolymers not so available, they can be prepared by known polymerization processes using coordination (Ziegler) catalysts, the vanadium components being soluble in hydrocarbon solvents such as hexane. Low molecular weights can be obtained by adding hydrogen to the polymerization reactor as is known in the art.

Additives can be mixed with the solid oil viscosity index improver and thus added to the oil during oil circulation through the filter. Illustrative additives are antioxidants, corrosion inhibitors, detergents, film strength agents, neutralizing agents and sludge inhibitors. By using the oil filter of the invention with solid oil viscosity index improver contained therein, with or without other additives, it may be feasible to use less expensive oil and upgrade it during use.

What is claimed is:

1. In combination with an oil filter, for use with an internal combustion engine using circulating oil, the improvement comprising an oil filter adapter, coaxial with and adjoining the oil filter, placed between the oil filter and the engine, said adapter comprising a casing having at least one opening to permit flow of oil from said engine to said adapter and at least one opening to permit flow of oil from said adapter to said filter and disposed in said casing in the path of the flowing oil and oil-soluble, solid oil viscosity index modifier and means in association with said modifier to limit contact of the surface of the modifier with the flowing oil wherein the solid copolymer is toroidal in shape and is encased in a perforated, oil insoluble metal shield.

2. The oil filter adapter of claim 1 wherein the solid, oil-soluble oil viscosity index modifier is a polymer selected from the group consisting of oil-soluble polyisobutylene, oil-soluble methacrylate polymer, oil-soluble polyalkyl styrene and an oil-soluble copolymer of ethylene and propylene.

3. The device of claim 1 wherein the solid, oil-soluble oil viscosity index improver is a polymer of ethylene and propylene with up to 10% by weight of 1,4-hexadiene.

4. The device of claim 3 wherein the solid copolymer is about 25 to 55% by weight ethylene, about 35 to 75% by weight propylene and up to 10% by weight of 1,4-hexadiene.

* * * * *